United States Patent [19]
Kirchner et al.

[11] 4,376,582
[45] Mar. 15, 1983

[54] OPTICAL FUEL PIN SCANNER

[75] Inventors: Tommy L. Kirchner; Hurshal G. Powers, both of Richland, Wash.

[73] Assignee: The United States of America as represented by the United States Department of Energy, Washington, D.C.

[21] Appl. No.: 214,805

[22] Filed: Dec. 9, 1980

[51] Int. Cl.³ .................... G06K 9/24; G06K 9/32; G02B 27/17
[52] U.S. Cl. .................................. 356/71; 250/236; 350/6.4
[58] Field of Search ............... 356/71, 241, 426, 240; 250/236, 566–568, 570, 224; 350/6.4; 340/146.3 F, 146.3 H; 235/467

[56] References Cited

U.S. PATENT DOCUMENTS

| | | | |
|---|---|---|---|
| 3,205,367 | 9/1965 | Whitesell | 250/235 |
| 3,290,650 | 12/1966 | Bailey, Jr. et al. | 340/146.3 |
| 3,300,757 | 1/1967 | Beltz | 340/146.3 |
| 3,428,812 | 2/1969 | Burke | 350/6.4 |
| 3,482,210 | 12/1969 | Lozier, Jr. et al. | 340/146.3 |
| 3,483,511 | 12/1969 | Rabinow | 340/146.3 |
| 3,676,847 | 7/1972 | Partin | 340/146.3 AC |
| 3,770,940 | 11/1973 | Harr | 250/203 R |
| 3,812,459 | 5/1974 | MacNeill et al. | 340/146.3 F |
| 3,866,056 | 2/1975 | Minniear et al. | 250/568 |
| 3,868,636 | 2/1975 | Schlang | 340/146.3 J |
| 3,903,503 | 9/1975 | Dillingham et al. | 340/146.3 J |
| 3,934,225 | 1/1976 | De Possel | 340/146.3 J |
| 3,935,441 | 1/1976 | Aldrich et al. | 250/211 R |
| 3,939,327 | 2/1976 | Humphrey | 250/567 |
| 4,056,804 | 11/1977 | Whitfield et al. | 340/146.3 J |
| 4,104,616 | 8/1978 | Isshiki et al. | 340/146.3 Y |

FOREIGN PATENT DOCUMENTS

| | | | |
|---|---|---|---|
| 1354683 | 1/1964 | France | 356/240 |
| 478330 | 8/1975 | U.S.S.R. | 350/6.4 |

OTHER PUBLICATIONS

Jones et al, "Data Entering System", IBM Tech. Disc. Bull., 10-1971, pp. 1376–1378.

*Primary Examiner*—William H. Punter

[57] ABSTRACT

An optical scanner for indicia arranged in a focal plane at a cylindrical outside surface by use of an optical system including a rotatable dove prism. The dove prism transmits a rotating image of an encircled cylindrical surface area to a stationary photodiode array.

6 Claims, 3 Drawing Figures

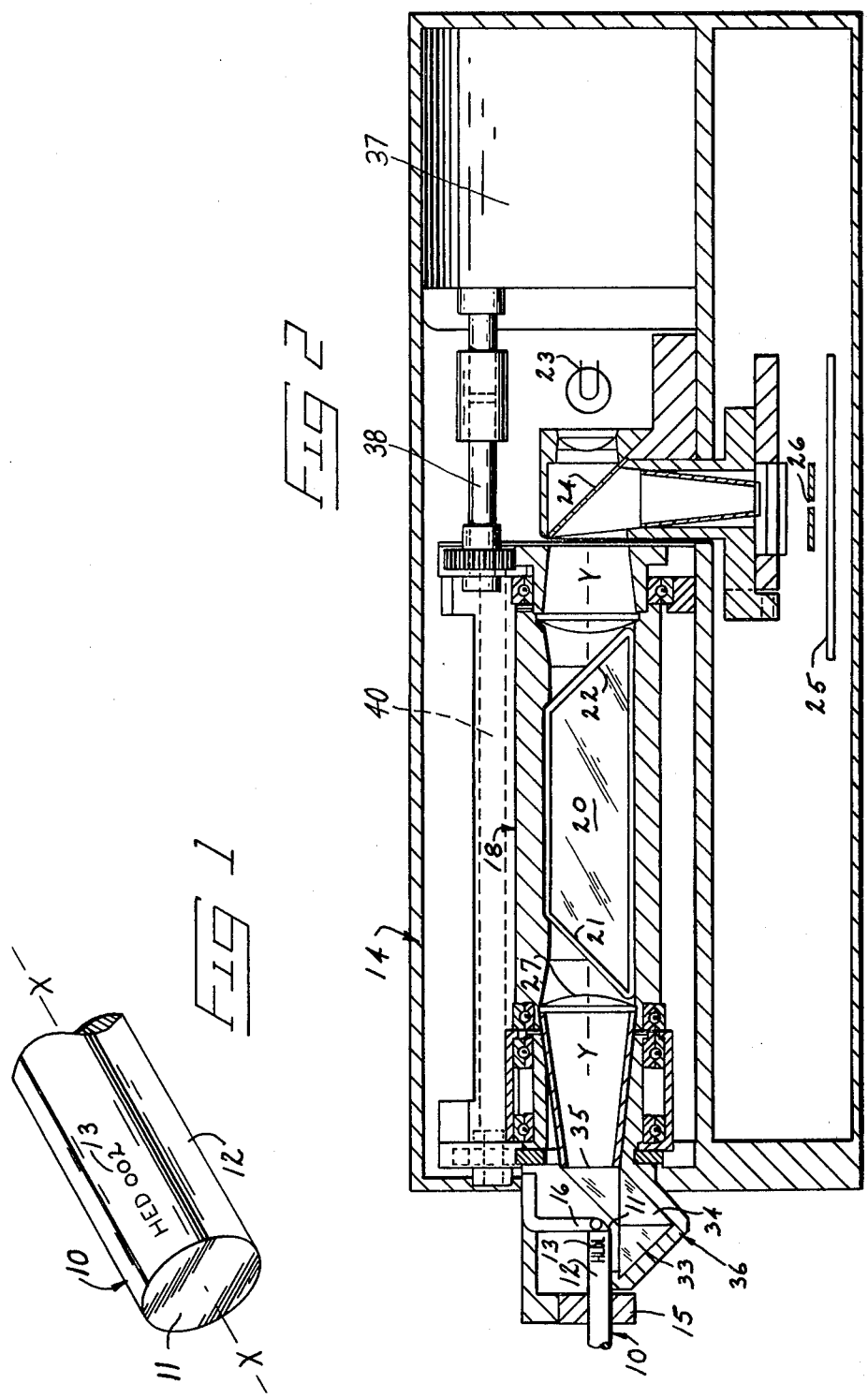

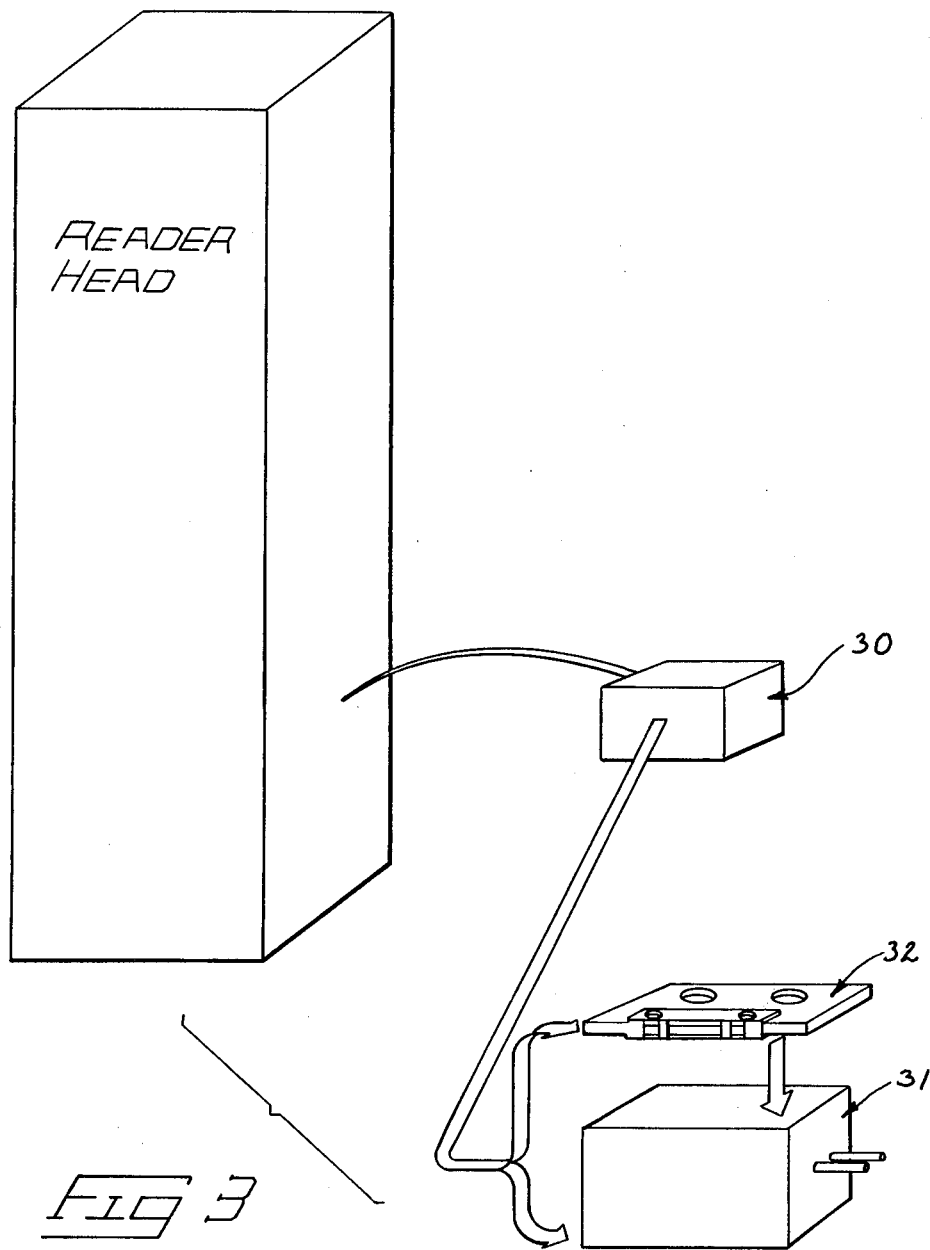

OPTICAL FUEL PIN SCANNER

The U.S. Government has rights in this invention pursuant to Contract No. EY-76-C-14-2170 between the U.S. Department of Energy and Westinghouse Electric Corporation.

BACKGROUND OF THE INVENTION

This disclosure relates to an optical identification system developed for post-irradiation disassembly and analysis of fuel bundle assemblies from a nuclear reactor or test facility.

Where large volumes of fuel pins are utilized in a nuclear facility, automated methods of fuel pin identification is needed after removal of the pins from the facility. As an example, used fuel pin bundles might contain several hundred fuel pins that will be removed for analysis and fuel reprocessing. The fuel pins must be extracted individually. The present apparatus is designed to be lowered onto a stationary fuel pin to read identification numbers or letters imprinted on the circumference of the top fuel pin and cap.

This apparatus was designed to meet the following technical requirements:

Read roll stamped numbers approximately 0.002 to 0.010 inch deep and raised no more than 0.003 inch above the cylindrical surface;

Read non-rotating fuel pins;

Withstand environmental conditions encountered during post-irradiation disassembly and analysis of fuel bundle assemblies at test facilities and reactors.

The described optical apparatus is used in conjunction with optical character recognition circuitry not described in detail herein. This circuitry receives digitized information from the apparatus and processes such information to convert it to usable data. The general nature of the required circuitry is common to other optical character recognition applications.

SUMMARY OF THE INVENTION

The following disclosure details an optical scanning apparatus for reading indicia imprinted about a cylindrical area. It includes a frame, a light detector for digitizing light patterns directed to it, indexing means for locating the cylindrical area about a reference axis, a light source for illuminating the area, optical means having both a dove prism rotatably aligned along the reference axis and a radial light receiver, and means for rotating the optical means about the reference axis.

It is a first object of this invention to provide an apparatus capable of precisely reading relatively small numerals or other alphanumeric information imprinted about a small diameter cylindrical surface.

Another object of the invention is to provide such a scanner which can accurately read indicia about the cylindrical surfaces of fuel pins without requiring their rotation.

Another object of the invention is to provide an assembly compatible with environmental requirements at nuclear fuel test facilities and reactors.

DESCRIPTION OF THE DRAWINGS

FIG. 1 is a top perspective view of a fuel pin imprinted about a cylindrical area at its upper end FIG. 2 is a schematic cross-sectional view of the reader head components; and FIG. 3 is a schematic view of the system in which the reader head is used.

DESCRIPTION OF THE PREFERRED EMBODIMENT

This disclosure relates to a reader head for optically scanning indicia imprinted about a cylindrical area, specifically a cylindrical surface about the upper end of a nuclear fuel pin cap. The outer portion of a fuel pin 10 is schematically illustrated in FIG. 1. It includes a transverse circular end 11 spanning an upper cylindrical wall 12 about the fuel pin. Imprinted indicia 13 is arranged circumferentially about the wall 12 on an exterior surface centered about the fuel pin axis X—X. The indicia 13 might be any selected combination of letters, numerals or other symbols desired for identification or other purposes.

The reader head is mounted within a frame or housing 14 which could be hand-held, but is preferably machine supported on an apparatus (not shown) providing relative axial movement between this apparatus and a fuel pin being identified by it. The reader head is adapted to receive the upper cylindrical end of a single fuel pin 10 and automatically read indicia 13 imprinted about its cylindrical wall 12. During this sequence, both the fuel pin 10 and the frame or housing are held stationary.

Indexing means is provided on the frame 14 in the form of a collet 15. The collet 15 might comprise any type of mechanical device for gripping the cylindrical area about wall 12. For instance, three radial fingers might be used to open and close radially about the upper end of the fuel pin 10. The indexing means also includes a positioning stop 16 fixed on frame 14 to axially locate the position of the pin 10 relative to frame 14.

The collet 15 and stop 16 accurately receive the top end of a fuel pin. They leave the imprinted area about the cylindrical wall 12 unobstructed for scanning purposes. The wall surfaces are thereby located in a stationary position within a preselected cylindrical focal plane on the supporting frame 14.

Light detector means is provided on frame 14 in the form of a conventional photodiode array 25, which receives incoming light through an aperture or slit 26. The photodiode array 25 digitizes rectangular slices imaged from the fuel pin wall 12 at the preselected focal plane on the frame 14. The optical image received by the photodiode array 25 will be proportional to the surface reflectivity at wall 12, permitting the reflected light to be converted into a series of digital signals for each scan.

Scanning of the area about the wall 12 is achieved through rotatable optical means mounted on the frame 14. The optical means includes a dove prism 20 having first and second oppositely directed ends 21 and 22. The prism 20 has a central prism axis Y—Y along the center of a clear aperture extending through ends 21 and 22. The prism 20 is located within a barrel 18 with its central prism axis Y—Y coincident with the rotational axis of barrel 18. Rotation of the prism 20 about this axis will result in corresponding rotation of the image transmitted through it. As such prisms are rotated, the image passing through rotates at twice the angular rate of the prism.

As shown, barrel 18 also mounts first focusing means in the form of a plano-convex lens 27 optically aligned with the central prism axis Y—Y. Lens 27 directs the image reflected from the focal plane to the first prism end 21.

A lamp 23 on the frame 14 provides light means directed onto the preselected focal plane. The light means also comprises a perpendicular beam splitter 24 shown as a diagonal one-way mirror. The beam splitter 24 simultaneously reflects light from lamp 23 to the focal plane of the optical apparatus and transmits light reflected from the focal plane through the rotatable optical means and to the photodiode array 25.

The aperture or slit 26 extends to one side from the imaged central prism axis in the rotating image as directed to the photodiode array 25.

The image of the imprinted indicia on wall 12 is directed to prism 20 by a radial light receiver that overlaps the position of the wall 12 within the indexing collet 15. The radial light receiver is capable of encircling the imprinted area and transmitting an image from it through the dove prism 20 and to the photodiode array 25. It is illustrated as a series of 45° reflective prisms 33, 34 and 35, which bend the image light path from the outer focal plane at the cylindrical surface to the axis through the dove prism 20. The prisms 33, 34 and 35 are independently rotatable within a supporting barrel 36, which is mounted on frame 14 coaxially with the previously described barrel 18 and central prism axis Y—Y. The prisms 33, 34 and 35 direct the image of the portion of the cylindrical surface in the focal plane to a plane perpendicular to the prism axis Y—Y, for subsequent image rotation by the rotating dove prism 20.

In use, the barrels 18 and 36 are individually rotated by a common drive motor 37 through separate drive shafts 38 and 40. The motor assembly 37 and drive connections to the barrels 18 and 36 are such that the barrel 36 rotates at an angular velocity slightly less than that of barrel 18. This has been found to be necessary in order to prevent distortion of indicia transferred through the reflective prisms 33, 34 and 35. In effect, the rotating dove prism 20 scans and imparts rotational movement to an image presented along axis Y—Y at a lesser rotational velocity. This image in turn is then transmitted to the photodiode array 25. Electronic slices of information from the photodiode array 25 will correspond to rectangular slices of optical information imaged along the cylindrical wall 12 of the fuel pin 10. A total scan of the cylindrical wall is thereby obtained. In practice it is desirable to make at least two revolutions of the fuel pin in order to permit electronic indexing in relation to gaps between the digits or to identify other indexing indicia necessary for verification purposes.

This arrangement makes use of the ability of a dove prism to rotate a stationary image without visual distortion. It is relatively simple in mechanical structure and can be readily incorporated within any apparatus for identification of stationary fuel pin surfaces.

As shown in FIG. 3, the reader head is used in combination with pre-optical character recognition electronics circuitry shown at 30, which typically would contain the system memory, automatic gain control circuits and a microprocessor to control the systems management functions of the apparatus. These circuits condition the video data from the reader head for direct input into the optical character recognition logic circuitry shown at 31. Circuitry 31 is a conventional logic unit which analyzes the fuel pin image and outputs the identification number in the desired format. A tape storage system, schematically shown at 32, can be included for field use of the optical reader head. Identification numbers stored in the system 32 can be used for later playback into the circuits 30 and 31 as desired.

Various modifications might be made in the specific arrangement of components without deviating from the general optical and mechanical concepts described above.

Having described my invention, I claim:

1. An apparatus for optically scanning indicia imprinted about an outer cylindrical surface of an article, said apparatus comprising:

a supporting frame;

light detector means fixed to said frame for digitizing light patterns directed thereto;

indexing means on said frame for coaxially locating an imprinted outer cylindrical surface about a reference axis on the frame;

light means for illuminating said imprinted outer cylindrical surface located by said indexing means;

optical means rotatably mounted on said frame about said reference axis, said optical means including a dove prism centrally aligned along the reference axis and a radial light receiver overlying the position of an imprinted cylindrical area located by said indexing means for encircling the imprinted cylindrical surface and transmitting an image from said surface through the dove prism and to said light detector means;

and means for selectively rotating said optical means relative to the frame about the reference axis.

2. An apparatus for optically scanning indicia imprinted about an outer cylindrical surface of an article, said apparatus comprising:

a supporting frame;

light detector means fixed to said frame for digitizing light patterns directed thereto;

indexing means on said frame for coaxially locating an imprinted outer cylindrical surface about a reference axis on the frame;

light means for illuminating said imprinted outer cylindrical surface located by said indexing means;

a dove prism having a central prism axis extending through oppositely inclined prism faces, said dove prism being coaxially mounted on said frame for rotation about said reference axis;

first focusing means on said frame optically aligned with the central prism axis for directing light to one prism face of the dove prism;

second focusing means on said frame optically aligned with the central prism axis for directing light from the remaining prism face of the dove prism to said light detector means;

radial light receiver means on said frame overlying the position of said imprinted cylindrical surface located by said indexing means for encircling the imprinted cylindrical surface and transmitting an image from said surface to said first focusing means;

and drive means on said frame operably connected to said dove prism, first and second focusing means and the radial light receiver means for selectively rotating them relative to the frame about the reference axis.

3. An apparatus as claimed in claim 2, wherein said light detector means is stationarily mounted to said frame at one side of the reference axis and faces toward such axis; and further comprising:

means fixed to said frame outward from the second focusing means and intersecting said axis for directing light images from the second focusing means onto said light detector means.

4. An apparatus as claimed in claim 2, wherein said light detector means is stationarily mounted to said frame at one side of the reference axis and faces toward such axis;
   said light means comprising a lamp aligned along said reference axis and positioned outward from the second focusing means;
   said apparatus further comprising:
   beam splitter means fixed to said frame between the second focusing means and the lamp and intersecting said axis for directing light images from the second focusing means onto said light detector means and for transmitting light from said lamp to said second focusing means along the central axis.

5. An apparatus as claimed in claim 2 wherein said drive means imparts differing rotational velocities to the dove prism and radial light receiver means.

6. An apparatus for optically scanning indicia imprinted about an outer cylindrical surface of a nuclear fuel pin in a circumferential pattern centered about the fuel pin axis;
   said apparatus comprising;
   a supporting frame;
   light detector means fixed to said frame for digitizing light patterns directed thereto;
   collet means on said frame for fixing the position of a fuel pin coaxially relative to a reference axis on the frame;
   rotatable optical means mounted on said frame for rotation about the reference axis, said optical means including a dove prism centrally aligned along the reference axis and a radial light receiver overlying the position of an imprinted area about the cylindrical surface of a fuel pin fixed by said collet means for transmitting a reflected image received radially from said cylindrical surface to a path directed through the dovetail prism along the reference axis;
   and stationary light reflecting means between the rotatable optical means and light detector means for directing reflected images from the dove prism to said light detector means.

* * * * *